United States Patent [19]

Kozuki et al.

[11] Patent Number: 4,544,959
[45] Date of Patent: Oct. 1, 1985

[54] VIDEO RECORDING SYSTEM

[75] Inventors: Susumu Kozuki, Tokyo; Makoto Takayama, Kanagawa, both of Japan

[73] Assignee: Canon Kabushiki Kaisha, Tokyo, Japan

[21] Appl. No.: 375,211

[22] Filed: May 5, 1982

[30] Foreign Application Priority Data

May 12, 1981 [JP]   Japan ................................ 56-71225

[51] Int. Cl.⁴ ........................................... H04N 5/782
[52] U.S. Cl. .................................. 360/33.1; 358/335; 358/906
[58] Field of Search .................. 358/342, 906; 360/60, 360/69, 33.1, 35.1

[56]  References Cited

U.S. PATENT DOCUMENTS

| 4,363,051 | 12/1982 | Maeda et al. ................... 358/906 X |
| 4,366,501 | 12/1982 | Tsunekawa et al. ............ 358/906 X |
| 4,368,490 | 1/1983 | Takimoto ........................ 358/906 X |
| 4,378,572 | 3/1982 | Hoffmann ....................... 358/906 X |
| 4,386,376 | 5/1983 | Takimoto et al. ............. 358/906 X |
| 4,400,743 | 4/1983 | Takimoto et al. ............. 358/906 X |

Primary Examiner—Donald McElheny, Jr.
Attorney, Agent, or Firm—Toren, McGeady, Stanger, Goldberg & Kiel

[57]  ABSTRACT

Disclosed is a video recording system comprising a video camera and a recorder for recording the output image signal of the video camera, wherein only at the time point at which the recorder is in the stand-by state the video camera can take picture.

20 Claims, 15 Drawing Figures

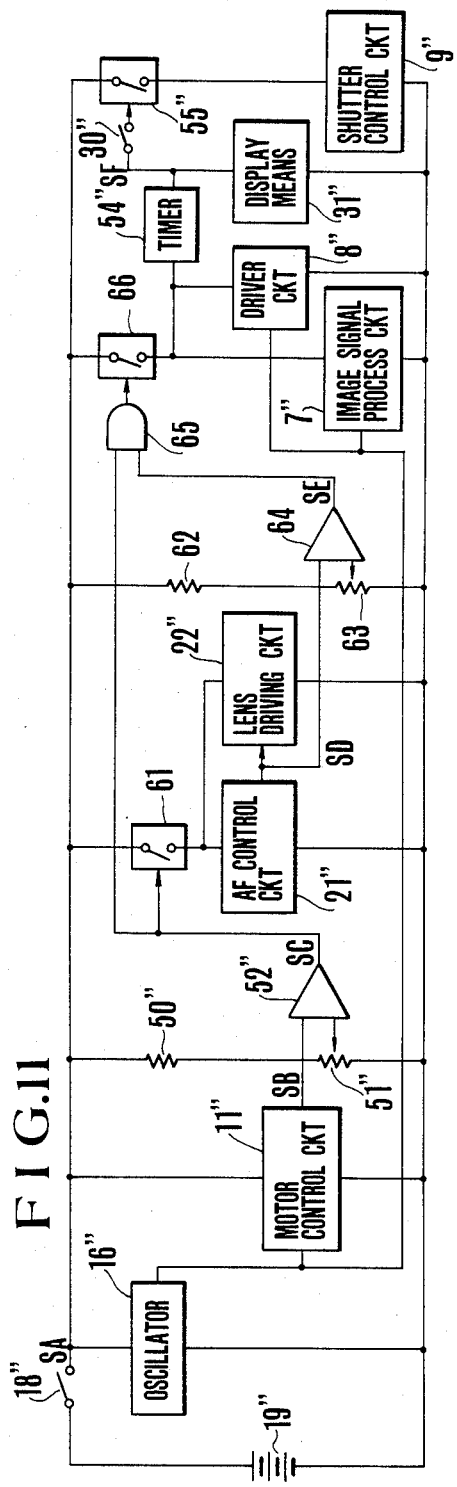
F I G.11
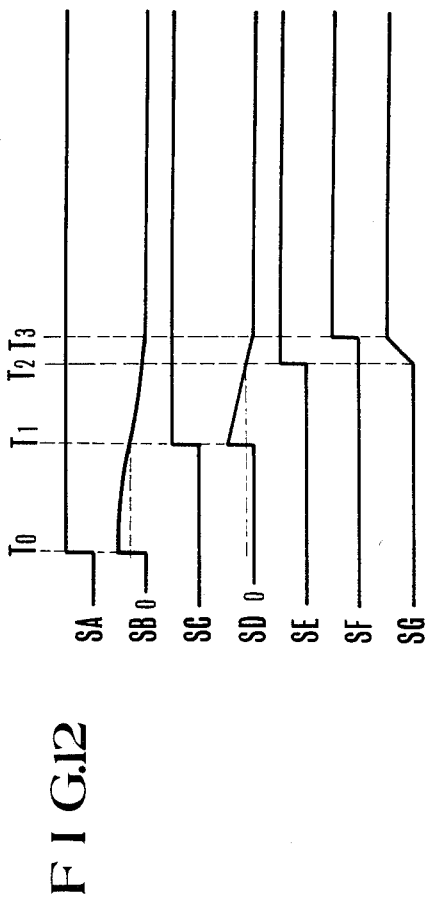
F I G.12

VIDEO RECORDING SYSTEM

BACKGROUND OF THE INVENTION

1. Field of the Invention

The present invention relates to a video recording system comprising a video camera and a recorder for recording the output image signal of the video camera, more particularly such system in which the video camera is separated from the video recorder, and the signal sending and receiving between them is made with the connection cable, or such system in which the camera and the recorder are integrated, and the start of the camera and that of the recorder are controlled with the operation of the trigger switch at the camera side.

2. Description of the Prior Art

So far in order to record the picture signal from the camera with the recorder, the recorder is kept in the so-called stand-by mode in which the tape running is prohibited although the servo system is in operation, while the tape is loaded and the drum motor, the capstan motor is brought in operation by operating the picture recording key of the recorder or the stand-by key and then brought in the so-called picture recording mode in which with the start of the camera the pinch roller is brought in contact with the capstan in a conventional way so as to start the tape.

Consequently, in the recorder itself it is necessary to operate the key and then the trigger lever at the camera side, which is disadvantageous for the quick photographing. Further, because the stand-by time (for picture recording) is long, the power consumption is large, which is inconvenient for the life of the battery.

Further, in the video camera it is also necessary to keep the camera in the stand-by state in which the camera is ready to deliver the picture signal by operating the key at the recorder side (for example the picture recording key or the stand-by key). Namely the photographing preparation includes various preparing operation such as 1 for keeping the image pick up tube, and the image receiving tube (in case of the electronic view finder) in the heated state of cathode, namely the normal operation state, 2 for finishing the white balance adjustment and 3 for checking the object condition, opening the burning prevention shutter and so on.

Namely, in other words in wider meaning the photographing ready state (the stand-by mode) of the camera is the mode of the state prior to the photographing state, namely the mode necessary for enabling the camera to produce the picture signal, in which point the stand-by mode is not limited to the above example. Until now such a stand-by mode of the camera is controlled with the operation key at the recorder side or the operation nob separately provided at the camera side. Thus, similarly to the above-mentioned conventional shortcomings, the ability for the quick photographing lacks or the mistaken picture recording is possible even when the output level of the image signal is improper because the time needed for bringing the camera in the stand-by mode is unknown.

SUMMARY OF THE INVENTION

It is an object of the present invention to provide a still and/or movie video recording system comprising a video camera and a video recorder so designed that in order to eliminate the above-mentioned shortcomings the power consumption is decreased without lowing the quick photographing efficiency, while in order to avoid the improper picture recording the normal operation is carried out only after the recorder and the camera have been prepared for picture recording and photographing.

It is another object of the present invention to provide a still and/or movie video recording system in accordance with which the photographing operation is possible only after the recorder has been prepared for picture recording.

It is further another object of the present invention to provide a video recording system in accordance to which the means for photographing and recording are brought into the operative state in accordance with the length of the rising up time, taking into consideration the rising up time needed after the current is delivered to the means till they are ready for the normal operation.

Further other objects of the present invention will be understood from the description to be made below with reference to the accompanying drawings.

BRIEF DESCRIPTION OF THE DRAWINGS

FIG. 1 shows the separate type and FIG. 2 the one body type.

FIG. 11 shows the circuit of further another example of the sequence control circuit in FIG. 6.

FIG. 12 shows the timing chart of the operation of each part in FIG. 11.

DESCRIPTION OF THE PREFERRED EMBODIMENTS

Figure 1:
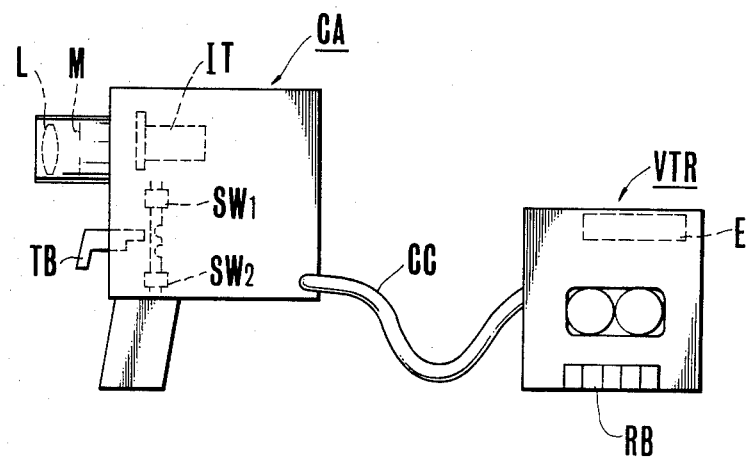
FIGS. 1 and 2 respectively show an embodiment of a video recording system consisting of a video camera and a video recorder, whereby

FIG. 1 shows in general the video recording system consisting of a combination of the video camera with the cassette type video cassette tape recorder as the video recorder, whereby the video camera CA is connected to the video tape recorder VTR with the connecting cable CC, by means of which a power is supplied to the camera CA from the power source E at the side of the recorder VTR and the video output and the signals of the switches SW1 and SW2 is delivered from the camera CA to the recorder VTR.

FIG. 1 shows a camera CA making one body with the recorder VTR, quite different from the system in FIG. 1, whereby the camera CA is connected to the recorder VTR with the cable CC.

Figure 2:
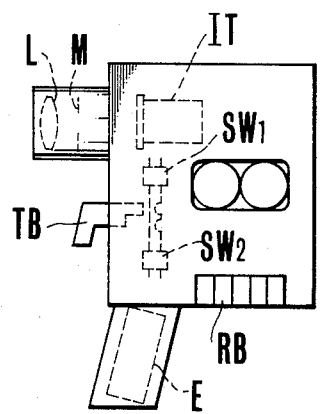

In FIGS. 1 and 2, L is the photographing lens, M the aperture, IT the image pick up tube and RB the recording button.

Figure 3:
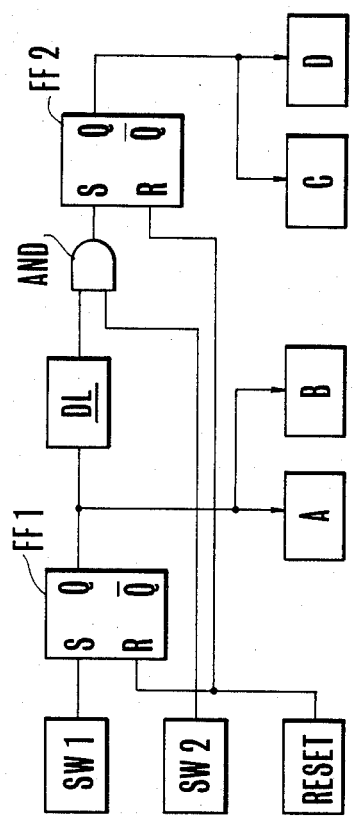
FIG. 3 shows the basic construction of an embodiment of the present invention in block diagram.

FIG. 3 shows the block diagram of the important electrical circuit of the first embodiment of the invention. In the drawing, SW1 and SW2 are the switching inputs to be controlled with the first and the second stroke of the trigger button TB of the above video camera CA. RESET is the reset input to be obtained with the release of the depression of the trigger button TB. FF1 and FF2 are the set reset flip-flop, DL the timer circuit and AND the AND circuit. The above control circuit produces (A) the recorder stand-by mode, (B) the camera stand-by mode, (C) the recorder picture recording mode and (D) the camera photographing mode.

When in the above-mentioned construction the trigger button TB at the side of the camera CA is depressed down to the first depression and the level of the switching input SW1 becomes high, the switching input SW1 is delivered to the terminal S of the first flip-flop FF1, from whose terminal Q a high level signal is delivered so as to instruct (A) the recorder stand-by and (B) the camera stand-by and close the timer circuit DL. The clock time of the timer circuit DL is determined in accordance with the time necessary for stabilizing (A) the recorder stand-by and (B) the camera stand-by. When then the trigger button TB is depressed down to the second stroke the level of the switching input SW2 becomes high, and the input SW2 is delivered to the AND circuit AND. The other input of the AND circuit AND is connected to the output of the timer circuit so that only when (A) the recorder stand-by and (B) the camera stand-by have been finished and the trigger button TB is depressed down to the second stroke a high level signal is delivered from the AND circuit AND to the S terminal of the second flip-flop 2. Thus, the level of the output Q of the flip-flop 2 becomes high and (C) the recorder picture recording mode and (D) the camera photographing mode are instructed, when the camera CD starts photographing, while the recorder VTR starts picture recording.

Figure 4:
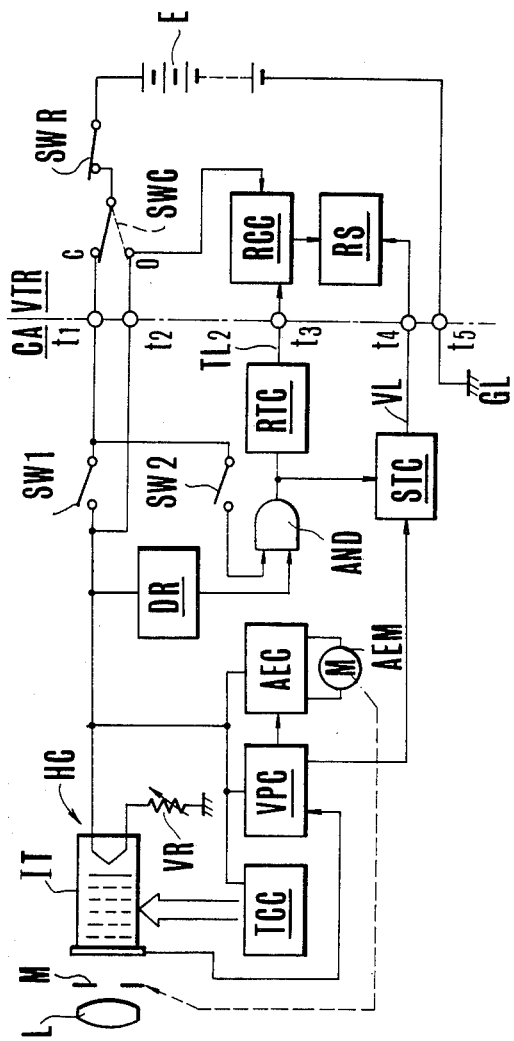
FIG. 4 shows the basic construction in FIG. 3 applied to the systems in FIGS. 1 and 2 in block diagram.

Below the embodiment in FIG. 3 will be explained in accordance with FIG. 4. In FIG. 4, the stand-by elements of the camera CA are(1) time when the operation of the aperture M for controlling the light amount passing the lens L is completed and (2) the time when the stabilization of the heater circuit HC of the image pick up tube is completed. In FIG. 4, CA is the video camera side and VTR the recorder side, whereby the terminals t1, t2, t3, t4 and t5 between CA and VTR separated with a dot dash line are connected with a cord in case the camera and the recorder is separated.

In the drawing, HC in the camera CA is the heater circuit of the image pick up tube, VR the voltage adjusting variable resistor, TCC the image pick up tube control circuit including the high voltage producing circuit and the deflecting circuit, VPC the video process circuit for producing the standard video signal from the scanning signal of the image pick up tube, AEC the automatic aperture control circuit for controlling the aperture meter AEM for controlling the aperture behind the lens L in accordance with the brightness signal from the video process circuit VPC and DL the timer circuit, whereby they are connected to the power source E via the recording switch SWR at the side of the VTR, the camera change over switch SWC at the side of the recorder VTR to be changed over to the side of C when the camera CA is connected to the recorder VTR and the switch SW1 at the camera side CA to be closed with the depression of the trigger button of the camera down to the first stroke.

The video signal from the video process circuit VPC is delivered to the signal recording system RS at the side of the recorder VTR via the switching circuit STC in the video signal output line VL. The switching input SW2 at the camera side CA to be closed with the depression of the trigger button down to the second stroke is together with the output of the above timer circuit DL to the AND circuit AND, whose output is delivered to the switching circuit STC as the closing signal and also to the recorder trigger circuit RCT as the recorder trigger signal, namely the recording start signal. The output of the circuit RCT is delivered to the signal recording device system control circuit RCC at the side of the recorder VTR via the trigger line TL. When the camera is used, the current is supplied to the control circuit RCC via the recording switch SWR at the side of the recorder VTR, the camera change over switch SWC and the first trigger switch SW1 at the camera side, while when the camera is not used, the control circuit is connected to the power source E via the recording switch SWR and the camera change over switch SWC (at this time at the side of O). Hereby, GL in the camera CA is the ground of the video.

First of all the recording switch SWR at the side of the recorder VTR is closed. Although not shown in the drawing in this state the tape at the side of the recorder VTR is carried in a conventional way.

Then the trigger button TB at the camera side is depressed down to the first stroke so as to close the switch SW1, when the current is supplied from the power source at the side of the recorder VTR to the circuit HC, TCC, VPC, AEC and DL at the camera side so as to start the operation of the camera. On the other hand, when along with the closing of the switch SW1 at the camera side CA the signal recording device system control circuit RCC at the side of the recorder VTR starts to operate and the signal recording system RS is set in the operative state, the recorder VTR is set in the stand-by state. When the trigger button TB is further depressed so as to close the second trigger switch SW2 after the camera CA in the stand-by state is focused at the object, the level of the signal of the switch SW2 becomes high and a high level signal is delivered to the one terminal of the AND circuit AND. Hereby, the time constant of the timer circuit DL is divided in accordance with the time needed for the complete stabilization of the stand-by at the side of the recorder VTR and that at the camera side CA. Consequently, after the lapse of the time needed for the stabilization of the stand-by of the recorder VTR and that of the camera CA the timer circuit DL delivers a high level signal to the one terminal of the AND circuit AND, whereby because the level of the output of the switch SW2 is high the switching circuit STC and the recorder trigger circuit RTC are closed. As the matter of fact before the lapse of the time needed for the stabilization of the stand-by of the recorder VTR and that of the camera CA the switch SW2 is closed and the output of the AND circuit AND remains low the switching circuit STC and the recorder trigger circuit RTC remains low until the time needed for the stabilization of the stand-by has elapsed. The output signal of the recorder trigger circuit RTC is delivered to the signal recording system control circuit RCC at the side of the recorder VTR via the trigger signal output line TL as the recorder trigger signal, and in accordance with the recorder trigger signal, namely the recording start signal the control circuit RCC works upon the signal recording system RS, at which time point the video signal from the video process circuit VPC via the switching circuit STC is recorded at the side of the recorder VTR.

Figure 5A:
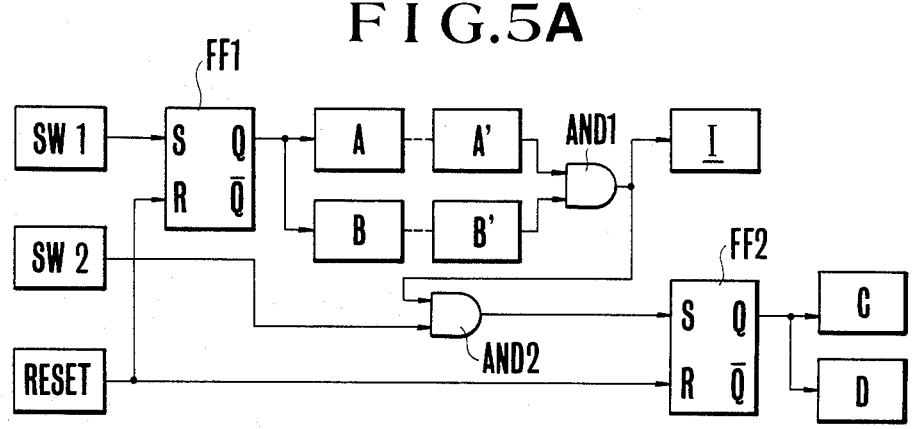
FIG. 5(A) shows the basic construction of another embodiment of the present invention in block diagram.
Figure 5B:
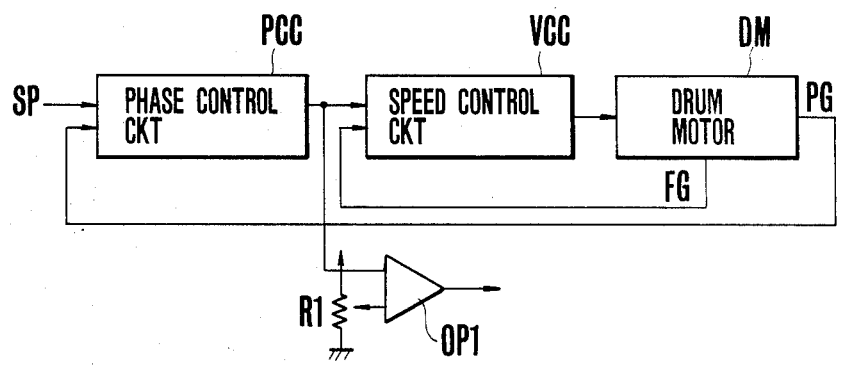
FIG. 5(B) shows an example of the recorder stand-by detecting circuit in block diagram.

Below the second embodiment will be explained in accordance with FIG. 5. In the drawing the members having the same members as those in FIG. 3 are the same members. In FIG. 5, A' and B' are the detecting circuit for detecting the completion of the stand-by of (A) the recorder stand-by mode and that of (B) the camera stand-by mode controlled with the first trigger switch SW1. The recorder stand-by completion signal and the camera stand-by completion signal are delivered to the AND circuit AND, whose output is connected to the stand-by completion display means 1. On the other hand the output of the AND circuit AND1 is delivered to the second AND circuit AND2 together with the signal of the second trigger switch SW2 in the same way as in FIG. 3.

FIG. 5 (B) shows a concrete embodiment of the circuit for detecting the recorder stand-by completion. In the drawing, PCC is the phase control circuit, VCC the speed control circuit, DM the drum motor, R1 the resistance OP1 the comparator and SP the synchronization signal for controlling the phase.

When the recorder is in the stand-by mode, a current is supplied to the drum motor DM so as to rotate the motor DM. The signal FG representing the rotation speed of the drum motor DM is fed back to the speed control circuit VCC, while the signal PG representing the rotation phase of DM is fed back to the phase control circuit PCC. The drum motor DM is controlled by means of the both control circuit so as to rotate at the correct speed in the correct phase, whereby the nearer the phase the correct phase, the lowerer the level of the output of the phase control circuit PCC. When the output level is almost zero, the output level of the comparator OP1 becomes high so as to detect the stand-by completion.

Figure 5C:
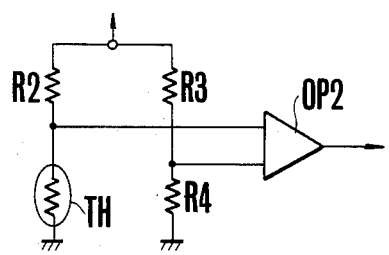
FIG. 5(C) shows the circuit of an example of the camera stand-by detecting circuit.

FIG. 5(C) shows a concrete embodiment for detecting the camera stand-by completion. In the drawing, R2-R4 are the resistance and TH the thermister for detecting the temperature arranged close to the cathode of the image pick up tube IT. OP2 is the operational amplifier.

When the heater of the image pick up tube is heated and the resistance of the thermister is lowered, the output level of the operational amplifier OP2 becomes high so as to detect that the camera is in stand-by mode.

The above construction will be explained in comparison with the embodiment in FIG. 3. In case of the embodiment shown in FIG. 3, the clock circuit DL is made use of in order to instruct (A) the recorder stand-by mode and (B) the camera stand-by mode and also determine the time needed for the stabilization of the both modes (A) and (B), while in case of the embodiment in FIG. 5 instead of the timer circuit the output signals of the circuits A' and B' for detecting the completion of the both stand-by modes (A) and (B). In other words in case of the embodiment in FIG. 3 the signal of the second trigger switch SW2 is made valid after the lapse of a certain determined time, while in case of the embodiment in FIG. 5 the signal of the switch SW2 is made valid with the signal representing the completion of the both stand-by modes. Further in case of the embodiment in FIG. 5 the stand-by completion display means 1 acting with the stand-by completion signal is also provided. As the stand-by completion display means 1 the display in the finder at the camera side CA with the light emitting element, the acoustic means and so on can be made use of.

So far only the stand-by mode of the recorder VTR in which the recorder trigger signal is not given has been explained. Namely, only the servo system works and the tape does not run yet. Further, the tape loading is carried out by means of a conventional method with the closing of the recording switch SWR in operative engagement with the recording operation key at the side of the recorder VTR. However, it goes without saying that the tape loading system can be included in the record stand-by mode (A), namely can be controlled with the switch SW1 at the camera side CA.

Further, the camera stand-by mode (B) at the side of the camera (A) is controlled only with the heater circuit HC of the image pick up tube FT, the image pick up tube control circuit TCC, the video process circuit VPC and the automatic aperture control circuit AEC. However, as another embodiment it is possible to include the white balance automatic adjusting circuit, the image pick up tube burning prevention release and so on in the camera stand-by mode (B).

So far the example of the motion picture recording system with the tape as the recording medium is explained. Below, the still picture recording system with the magnetic disc as the medium will be explained.

Figure 6:
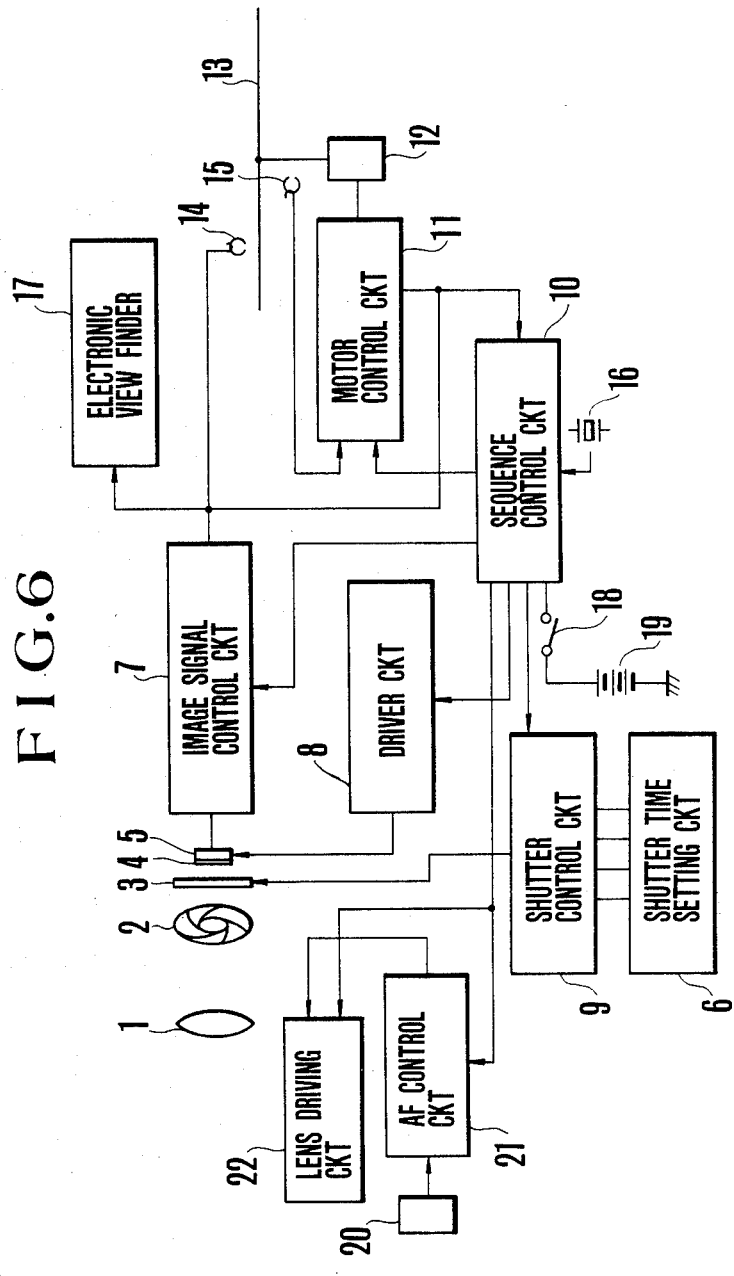
FIG. 6 shows an example of the still video camera in block diagram.

FIG. 6 shows an embodiment of the still video camera in block diagram.

In the drawing, 1 is the image pick up optical system. 2 is the aperture means, which may either be physical or mechanical. 3 is the shutter means, which may either be physical or mechanical or be made use of in common with the aperture means. 5 is the photoelectric transducing type image pick up means such as CCD (charge coupled device).

4 is the color filter arranged in front of the image pick up means and can be either stripe type or mosaic type. This filter can be omitted in case of the white and black picture. 6 is the shutter time setting circuit and 7 the image signal process circuit for converting the image information from the image pick up means into proper signal form. 8 is the driver circuit for controlling the scanning of the image pick up means 5, the transfer and so on. 9 is the shutter control circuit for controlling the operation of the shutter means 3 in accordance with the set value of the setting circuit 6. 10 is the sequence control circuit for controlling the whole still video camera of the present embodiment.

11 is the motor control circuit to be controlled with the sequence control circuit along with the closing of the power source. 12 is the motor synchronously controlled with the control circuit 11, 13 the magnetic disc driven with the motor, 14 the magnetic head and 15 the PG head for feeding back the rotation phase of the motor to the motor control circuit 11. The terminal F is for delivering the servo clock signal, 16 the clock generator, 17 the electronic view finder for displaying the object image, 18 the power source switch, 19 the battery, 20 the detector for detecting the distance up to the object and 21 the automatic focus control circuit (hereinafter called AF control circuit) for controlling the lens driving device for driving the lens in accordance with the distance detected with the detecting device 20.

Figures 7, 8:
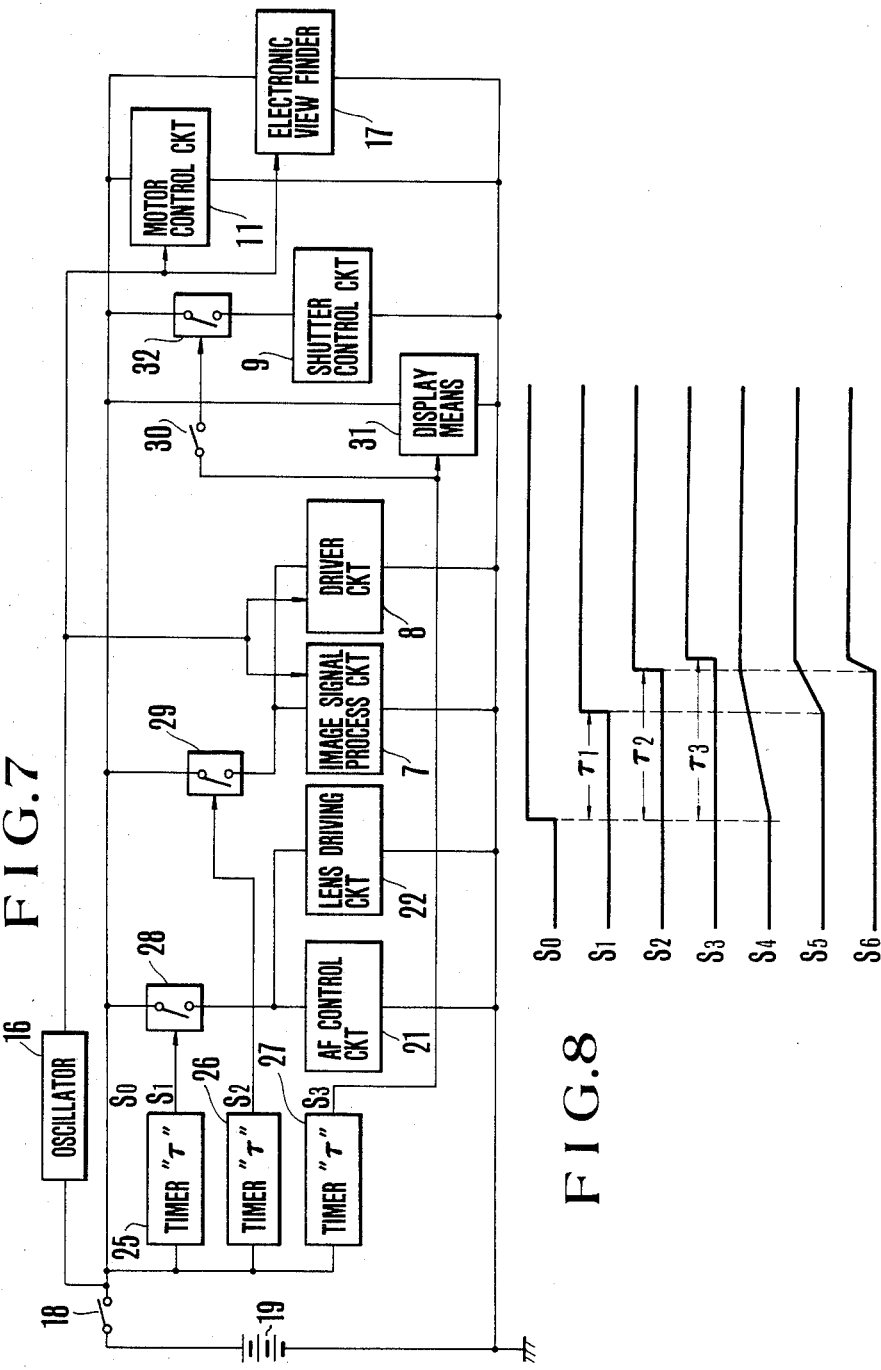
FIG. 7 shows the circuit of an example of the sequence control circuit.
FIG. 8 shows the timing chart of the operation of each part in FIG. 7.

FIG. 7 shows the sequence control circuit 10 in FIG. 6 in detail, while FIG. 8 shows the timing chart at each part in FIG. 7.

In FIGS. 7, 25, 26 and 27 are respectively a timer with the delay time $\tau 1$, $\tau 2$ and $\tau 3$, 28, 29 and 32 the switches, 30 the release button and 31 the display means for displaying the releasability. Below the operation will be explained in accordance with the timing chart in FIG. 8.

When the power source switch 18 is depressed, the current is supplied from the battery 19 to the timers 25, 26 and 27, the generator 16, the motor control circuit, the electronic view finder 17 and the display means 31.

At the same time with the current supply the motor control circuit 11 drives the motor, controlling so as to drive the magnetic disc with the synchronizing signal from the generator 16 and the output pulse from the PG head at a certain determined speed.

The current delivered to the electric view finder starts to heat the cathode of the view finder 17. After the lapse of the time $\tau 1$ after closing the power source switch 18 the output level of the timer 25 becomes high so as to close the switch 28. Then the current is delivered to the AF control circuit 21 and the lens drive circuit 22 so as to automatically adjust the focusing. After the further lapse of the time $\tau 2$ after closing the power source switch 18 the output level of the timer 26 becomes high so as to close the switch 29, when the current is delivered to the image signal process circuit 7 and the driver circuit 8.

Then, after the lapse of the time $\tau 3$ after closing the power source switch 18 the output level of the timer 27 becomes high so as to light the display means 31 and let the photographer the releasability (photographability).

When at this time point the photographer depresses the release button 30, the switch 32 is closed and the shutter control circuit 29 operates. Then the shutter 3 operates and the signal from the image pick up means 5 is delivered to the recording head 14 via the image signal process circuit 7 and recorded on the correctly rotating magnetic disc 13. Hereby, even if the release button 30 is depressed before the lapse of the time $\tau 3$ after closing the power source switch 18, the switch 32 is not closed because the output level of the timer 27 is low. Thus the image pick up and the recording operation are not carried out.

Hereby, FIG. 8 S4 shows the rising up characteristics of the motor control circuit 11 and the electronic view finder 17, FIG. 8 S5 that of the AF control circuit 21 and the lens driving circuit 22 and FIG. 8 S6 that of the image signal process circuit 7 and the driver circuit 8. As is shown in the drawing, the time needed since the current is delivered to the motor control circuit 11 till the magnetic disc rotates at the correct speed is $\tau 3$. The time needed since the current is delivered to the electronic view finder 17 till the finder becomes visible almost corresponds to $\tau 3$ also. The maximum time needed since the current is delivered to the AF control circuit 21 and the lens driving circuit 22 time the lens is automatically focused is $(\tau 3 - \tau 1)$.

The time needed since the current is delivered to the image signal process circuit 7 and the driver circuit 8 till the signal can be read from CCD5 is the time $(\tau 3 - \tau 2)$. As is clear from the drawing, $\tau 1 < \tau 2 < \tau 3$, $(\tau 3 - \tau 2) < (\tau 3 - \tau 1) < \tau 3$.

As explained above in case of the present embodiment during the time since the power source is closed till the photographability is reached, the current is delivered to the circuits successibly in accordance with the length of the time up to the rising up.

In this way, the power consumption can be made minimum. Particularly by making the timing of the rising up all members for the photographing correspond to each other the power consumption can be made minimum.

In the same way as in case of the afore-mentioned embodiment of the motion picture the photographing is allowed only after all of the means for photographing and recording operate properly so that there takes place no mistaken recording nor improper recording.

Figure 9A:
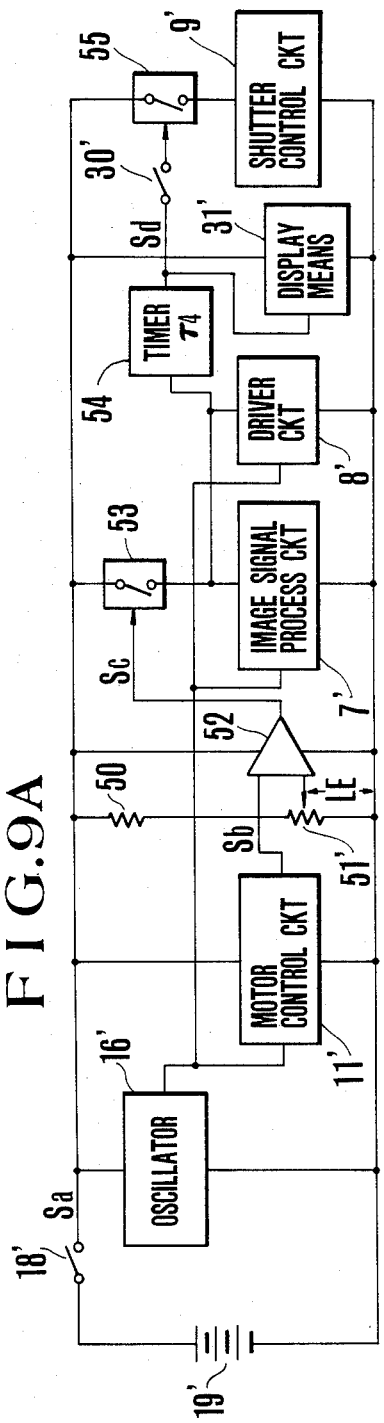
FIG. 9(A) shows the circuit of another example of the sequence control circuit in FIG. 6.
Figure 10:
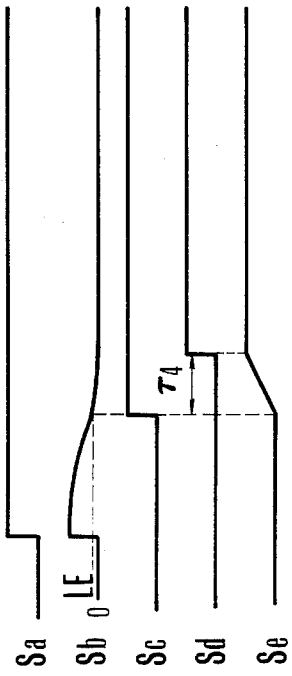
FIG. 10 shows the timing chart of each part in FIG. 9(A).

Below the second embodiment of the sequence control circuit 10 in FIG. 6 will be explained in accordance with FIGS. 9 A, B and FIG. 10. In the drawing the members having the same efficiency as those in FIG. 7 are provided with "'". In the drawing, 50 and 51 are the voltage dividing resistor, 52 the comparator, 53 and 55 the switch, 54 the timer, 56 the phase comparator and 57 the speed control device. Further Sa is the closing signal of the power source switch, Sb the phase error signal, Sc the output signal of the comparator 52, Sd the output signal of the timer 54, Se the signal representing the rising up of the signal process circuit 7' and that of the driver circuit 8'.

Figure 9B:
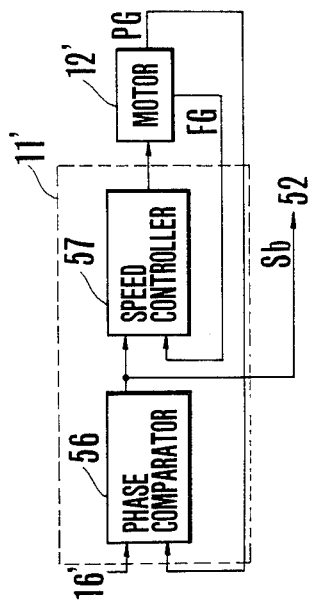
FIG. 9(B) shows the motor control circuit in FIG. 9(A) in detail.

Along with the closing of the power source switch 18' the synchronization signal is delivered from the generator 16' to the motor control circuit 11', to which the current is delivered from the power source at the same time. The motor control circuit 11' consists, as is shown in FIG. 9B in detail, the phase comparator 56 and the speed control means 57, whereby the FG pulse is fed back from the motor 12' to the speed control means 57, while PG pulse is fed back to the phase comparator. The phase comparator 56 compares the synchronization signal from the generator 16' with the phase error of PG pulse and delivers the phase error signal representing the phase error to the speed control device 57. This phase error signal Sb is delivered to the one input of the comparator 52, to whose other input terminal the voltage of the level LE is delivered. When the level of the error signal Sb is decreased to some extent under the level LE, the level of the output Sc of the comparator 52 becomes high so as to close the switch 53 and delivers the current to the image signal process circuit 7' and the driver circuit 8'. At the same time the timer 54 starts to clock. The clock time of the timer is $\tau 4$, which is set so as to almost correspond to the rising up time of the image signal process circuit 7' and the driver circuit 8'. At the end of the clock time of the timer 54 the level of its output becomes high so as to display the photographability in the display means 31'. Along with the operation of the release button 30' the photographing is started. Further, at the end of the clock time of the timer 54 the level of the phase error signal Sb is zero. As in case of the present embodiment by detecting the actual amount of the motor phase error the magnetic disc is correctly rotating when the release button is operated, so that a precise recording of the image signal can be obtained.

FIG. 11 shows the third embodiment of the sequence control circuit 10. The members having the same efficiency as those in FIGS. 7 and 9 are provided with "''".

61 and 66 are the switches, 62 and 63 the resistances, 64 the comparator and 65 the AND gate.

After closing the power source switch 18″ the comparator 52″ detects that the level of the phase error signal is below a certain determined level so as to close the switch 61 and bring the AF control circuit 21″ and the lens driving circuit 22″ in the operative state. Then, the comparator detects that the level of the lens driving control signal from the AF control circuit 21″ to the lens driving circuit 22″ representing the deviation from the focus position is below a certain determined one. When the level of the output of the comparator 64 and that of 52″ are high the level of the output of the AND gate 65 becomes high so as to close the switch 66 and the image signal process circuit 7″ and the driver circuit 8″. The operation after this is same as in case of the embodiment shown in FIG. 9.

FIG. 12 shows the signal wave form at every part in FIG. 11.

SA is the closing signal of the power source switch 18″. SB the phase error signal, SC the output signal of the comparator 52″, SD the lens driving control signal, SE the output signal of the comparator 64, SF the output signal of the timer 54″ and SG the rising up state of the image signal process circuit 7″ and that of the driver circuit 8″.

As is shown in FIG. 12, the reference voltage of the comparators 52″ and 64 is set in such a manner that at the time point at which the level of the phase error signal SB becomes zero, the level of the lens driving control signal SD becomes zero, while the image signal process circuit 7″ and the driver circuit 8″ also rise up.

In this way only after the magnetic disc runs correctly, the lens is correctly focused and the signal process circuit has risen up, the release is possible. Thus, there takes place no focus out, while a precise magnetic recording is possible.

Hereby, in case of the afore-mentioned embodiment the power source switch is provided separately from the release button, while it is possible, as the trigger button shown in FIGS. 1 and 2, to close the power source switch with the first stroke and operate the release button with the second stroke.

As explained so far in detail in accordance with the present embodiment the photograph can be taken quickly, the power consumption is very small and improper picture recording is prevented, so that a video recording system consisting of a video camera and the video recorder designed in such a manner that the normal operation can be carried out only after the recorder and the camera have been prepared for recording and photographing can be realized, which is remarkably profitable.

The present invention is not limited to the afore-mentioned embodiments but can be modified in many variation within the gist of the claim.

For example in case of the embodiment the current is delivered to the members in accordance with the length of their rising up time only in the still picture recording system, whereby the present invention also includes the application of the above for the motion picture recording system.

What is claimed is:

1. A video recording system comprising in combination:
   (A) image pick-up means for producing an electrical signal corresponding to a received object image, said pick-up means having a partially operative standby state for preparation of the production of said signal and a fully operative state at which the pick-up means produces the signal;
   (B) recording means for recording the electrical signal produced from said image pick-up means on a recording medium, said recording means having a partially operative standby state for a preparation of the signal recording and a fully operative state at which the recording means records the signal on the medium;
   (C) first instruction means for setting said image pick-up means and said recording means at their respective standby states;
   (D) second instruction means for producing an instruction to set said image pick-up means and said recording means at their respective fully operative states; and
   (E) control means for inhibiting the instruction of said second instruction means until said image pick-up means and said recording means reach their respective standby state.

2. The system according to claim 1, wherein said control means includes timer means for clocking a predetermined period of time which is sufficient for said image pick-up means and said recording means to reach their respective standby states after said first instruction means is operated and for inhibiting the instruction by said second instruction means until said timer means finishes said predetermined period of time.

3. The system according to claim 1, wherein said control means includes detecting means for detecting that said image pick-up means and said recording means have reached their respective standby states and for inhibiting the instruction by said second instruction means until said detecting means detects that the image pick-up means and the recording means reaches their respective standby states.

4. The system according to claim 1, 2, or 3, wherein said first and said second instruction means are arranged to be operated by common operation means.

5. The system according to claim 4, wherein said first instruction means is arranged to be operated when said operation means is operated by a predetermined amount, while said second instruction means is arranged to be operated when the operation means is operated more than said predetermined amount.

6. The system according to claim 1, 2, or 3, wherein said recording means includes;
   at least one magnetic head for recording the signal on the recording medium; and
   a motor for relatively moving said head and the recording medium.

7. The system according to claim 6, wherein at the standby state of said recording means, said motor reaches a predetermined rotation speed;
   said control means being arranged to inhibit the instruction by said second instruction means until at least said motor reaches said speed.

8. The system according to claim 6, wherein the recording medium is a magnetic tape and said motor is arranged to rotate said head relative to the tape.

9. The system according to claim 6, wherein the recording medium is a magnetic disc and said motor is arranged to rotate the disc relative to said head.

10. The system according to claim 1, 2, or 3, wherein said image pick-up means includes an image pick-up tube.

11. The system according to claim 10, wherein at the standby state of said image pick-up means, said image pick-up tube is sufficiently heated;

said control means being arranged to inhibit the instruction by said second instruction means until at least said image pick-up means is sufficiently heated.

12. A video recording system comprising:
(A) image pick-up means for producing an electrical signal corresponding to a received image, said pick-up means having a predetermined rise time necessary to reach a predetermined operative state for the production of said signal after a power supply thereto;
(B) recording means for recording the electrical signal produced from said image pick-up means on a recording medium, said recording means having a predetermined rise time necessary to reach a predetermined operative state for the signal recording after a power supply thereto;
(C) power supply circuit means for supplying said image pick-up means and said recording means with electrical power; and
(D) control means for controlling power supply to said image pick-up means and to said recording means, said control means being arranged to start power supply to the pick-up means and to the recording means at different timings according to their respective rise times.

13. The system according to claim 12, wherein said power supply circuit means includes a power source switch;

and said control means includes timer means responsive to said switch to start to clock and is arranged to start power supply to said recording means and to said image pick-up means in sequence according to the clocking by said timer means.

14. The system according to claim 13, wherein said timer means is arranged to clock the respective rise times of said image pick-up means and said recording means.

15. The system according to claim 12, 13, or 14, wherein said recording means includes:
at least one magnetic head for recording the signal on the recording medium; and
a motor for moving said head and the recording medium relative to each other.

16. The system according to claim 15, wherein said motor necessitates said rise time to reach a predetermined rotational speed after supply of power thereto.

17. The system according to claim 15, wherein the recording medium is a magnetic tape and said motor is arranged to rotate said head relative to the tape.

18. The system according to claim 15, wherein the recording medium is a magnetic disc and said motor is arranged to rotate the disc relative to said head.

19. The system according to claim 12, 13, or 14, wherein said image pick-up means includes an image pick-up tube.

20. The system according to claim 19, wherein said image pick-up tube necessitates said rise time to reach a sufficiently heated state after the power supply thereto.

* * * * *